(12) United States Patent
Xi et al.

(10) Patent No.: US 10,467,312 B2
(45) Date of Patent: Nov. 5, 2019

(54) LOCATION AND ORIENTATION BASED DIGITAL MEDIA SEARCH

(71) Applicant: Cisco Technology, Inc., San Jose, CA (US)

(72) Inventors: Yasi Xi, Hefei (CN); Zhaocai Wang, Hefei (CN); Grant Pan, Hefei (CN); Kent Chen, Hefei (CN)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 15/426,993

(22) Filed: Feb. 7, 2017

(65) Prior Publication Data

US 2018/0224560 A1 Aug. 9, 2018

(51) Int. Cl.
*G06F 16/95* (2019.01)
*G06F 16/9537* (2019.01)
*G06F 16/40* (2019.01)
*H04W 64/00* (2009.01)
*G06F 3/0481* (2013.01)

(52) U.S. Cl.
CPC .......... *G06F 16/9537* (2019.01); *G06F 16/40* (2019.01); *G06F 3/04817* (2013.01); *G06F 2203/04806* (2013.01); *H04W 64/00* (2013.01)

(58) Field of Classification Search
CPC ... G06F 16/9537; G06F 16/40; G06F 3/04817
See application file for complete search history.

(56) References Cited

U.S. PATENT DOCUMENTS

| | | | | |
|---|---|---|---|---|
| 2011/0199479 | A1* | 8/2011 | Waldman | G01C 21/3602 348/116 |
| 2014/0244160 | A1* | 8/2014 | Cragun | G01C 21/20 701/436 |
| 2016/0080643 | A1* | 3/2016 | Kimura | H04N 5/23206 348/207.1 |

* cited by examiner

*Primary Examiner* — Loc Tran
(74) *Attorney, Agent, or Firm* — Merchant & Gould P.C.

(57) ABSTRACT

In one embodiment, a client computing device stores a plurality of digital media files. For each digital media files, the client computing device stores data identifying a geographic location associated with the digital media file. When the client computing device receives a request to view digital media files through a graphical user interface, the client computing device uses a GPS receiver to determine a geographic location of the client computing device and an electronic compass circuit to determine an orientation of the client computing device. Based, at least in part, on the location and orientation of the client computing device, the client computing device identifies a plurality of particular geographic locations that are associated with one or more digital media files. The client computing device displays icons corresponding to the plurality of particular geographic locations, ordered by a distance from the client computing device to each of the location. The client computing device additionally displays, with each of the icons, one or more sample digital media files associated with a geographic location corresponding to the icon.

18 Claims, 6 Drawing Sheets

LOCATION AND ORIENTATION BASED DIGITAL MEDIA SEARCH

FIELD OF THE INVENTION

The present invention relates to storage and display of digital media on a computing device based on a location and orientation of the computing device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Mobile computing devices, such as smart phones, are becoming more prevalent in the modern age. As mobile computing devices improve, the amount of storage on the mobile computing devices improve as well. Many current smart phones are equipped with cameras and are capable of storing thousands or tens of thousands of digital images.

As the amount of storage for mobile computing devices increases, finding particular digital media becomes more and more difficult. With thousands of images stored on a single smart phone, finding particular images becomes difficult. Often even if the user of the mobile computing device knows where the particular image was taken, the user would have difficulty finding the particular digital image on the mobile computing device.

DESCRIPTION OF EXAMPLE EMBODIMENTS

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

1. Overview

Aspects of the disclosure generally relate to performing a location based search for digital media files. In an embodiment, digital media files are stored on a client computing device along with location information identifying a location associated with the digital media files. When the client computing device receives a request for a search of the digital media files, the client computing device uses a Global Positioning Service (GPS) receiver and an electronic compass circuit to determine a location and orientation of the client computing device. Based on the location and orientation of the client computing device, the client computing device identifies a plurality of locations associated with digital media files and displays icons corresponding to the locations on the client computing device.

In an embodiment, a method comprises storing, on a client computing device, a plurality of digital media files; for each digital media file of the plurality of digital media files, storing, on the client computing device, data identifying a geographic location associated with the digital media file; receiving, through a graphical user interface of the client computing device, a request to view digital media files; in response to receiving the request to view digital media files, using a GPS receiver of the client computing device, determining a geographic location of the client computing device, and using an electronic compass circuit of the client computing device, determining an orientation of the client computing device; identifying a plurality of particular geographic locations other than the geographic location of the client computing device based, at least in part, on the geographic location and the orientation of the client computing device, wherein each of the plurality of particular geographic locations is associated with one or more digital media files of the plurality of digital media files; displaying, on the client computing device, icons corresponding to each of the plurality of particular geographic locations, ordered by a distance from the client computing device to each of the plurality of particular geographic locations; displaying, on the client computing device, with each of the icons, one or more sample digital media files associated with a geographic location corresponding to the icon.

2. Example Embodiments

Figure 1:
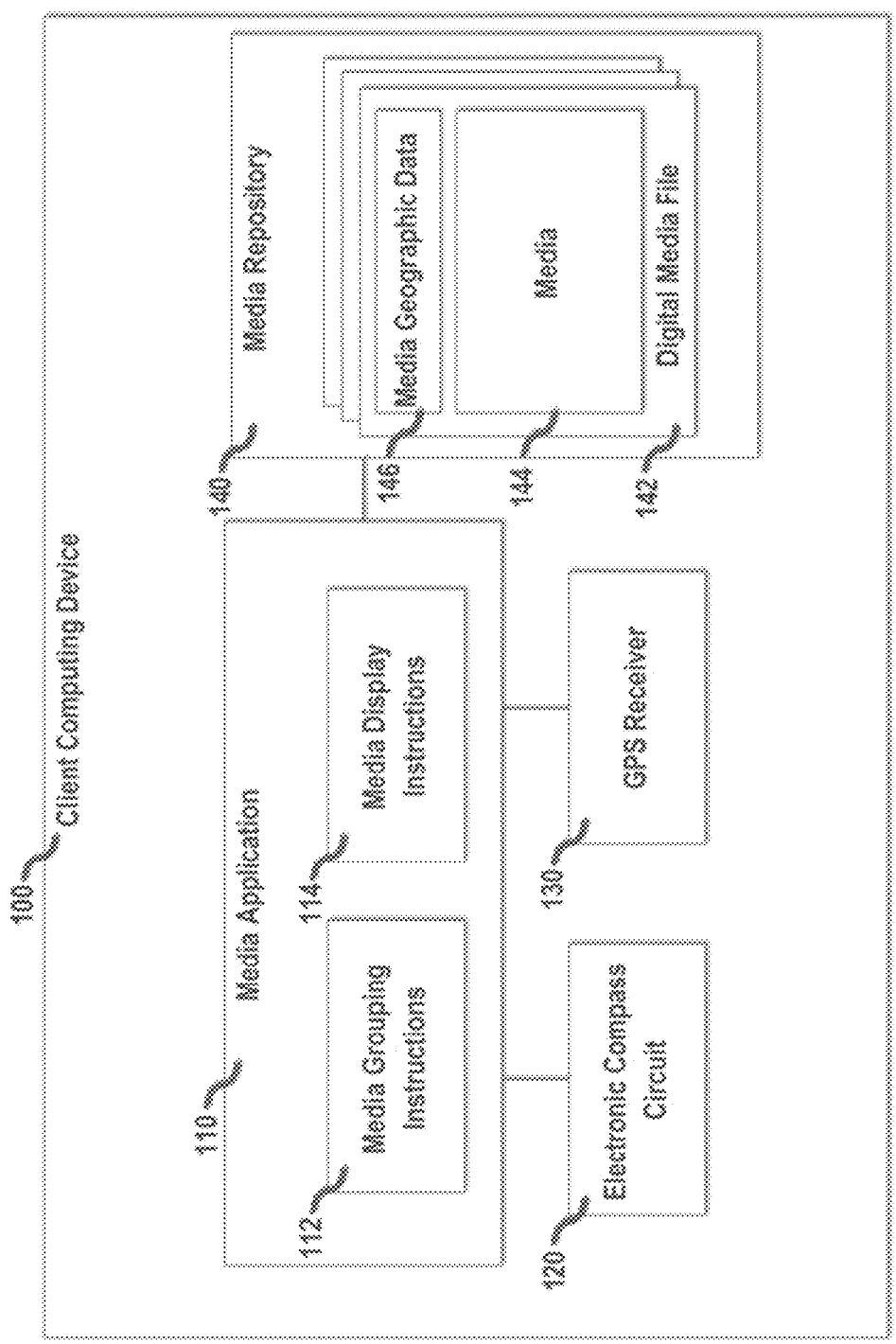
FIG. 1 depicts a client computing device that is programmed or configured to perform an orientation-based media search.

FIG. 1 depicts a client computing device that is programmed or configured to perform an orientation-based media search.

Client computing device 100 may be any of a laptop, netbook, personal computer, workstation, smartphone, PDA, tablet, or other computing device capable of performing the methods described herein. Client computing device contains an electronic compass circuit 120, a global positioning system (GPS) receiver 130, a media application 110, and a media repository 140. Client computing device 100 may also include other devices, components, or elements of a computer system such as volatile or non-volatile memory, non-volatile storage such as disk, and I/O devices or interfaces as seen and described, for example, in connection with FIG. 6.

In an embodiment, media application 110 comprises a digital application configured with instructions that may be used to facilitate a method for displaying digital media on client computing device 100. Media application 110 may contain media grouping instructions 112 and media display instructions 114. Media grouping instruction 112, when executed by client computing device 100 through media application 110, causes client computing device 100 to identify media items to be displayed on the client computing device based on a geographic location and orientation of the client computing device. Media display instructions 114, when executed by client computing device 100, cause client computing device 100 to display digital media files and sample digital media files through a graphical user interface executing on client computing device 100.

In an embodiment, media grouping instructions and media display instructions 114 each comprises a set of one or more pages of main memory, such as RAM, in the client computing device 100 into which executable instructions have been loaded and which when executed cause the client computing device to perform the functions or operations that are described herein with reference to those instructions. For example, the media grouping instructions may comprise a set of pages in RAM that contain instructions which when executed cause performing the media grouping functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of media grouping instructions 112 and media display instructions 114 also may represent one or more files or projects of source code that are digitally stored in a mass storage device such as non-volatile RAM or disk storage, in the client computing device 100 or a separate repository system, which when compiled or interpreted cause generating executable instructions which when executed cause the client computing device to perform the functions or operations that are described herein with reference to those modules. In other words, the drawing figure may represent the manner in which programmers or software developers organize and arrange source code for later compilation into an executable, or interpretation into bytecode or the equivalent, for execution by the client computing device 100.

In an embodiment, electronic compass circuit 120 comprises an electronic compass configured to identify an orientation of client computing device 100. The electronic compass circuit may include a magnetometer which identifies the orientation of the client computing device based on Earth's magnetic field. The media application 110 may be programmed or configured to request orientation data from the electronic compass circuit of the client computing device. For example, media application 110 may be configured to directly interact with an electronic compass of a smart phone or other mobile device. Additionally or alternatively, media application 110 may interact with one or more compass applications of the client computing device which interact directly with the electronic compass circuit 120.

In an embodiment, GPS receiver 130 comprises one or more hardware and/or software components of client computing device 100 that are programmed or configured to interact with a GPS satellite in order to identify a position of the client computing device 100. Media application 110 may be programmed or configured to request location data from GPS receiver 130. For example, media application 110 may be configured to directly interact with a GPS receiver of a smart phone or other mobile device. Additionally or alternatively, media application 110 may interact with one of more GPS application of the client computing device which interact directly with the GPS receiver 130.

In an embodiment, media repository 140 comprises a data repository that is configured to store one or more digital media files 142. Media repository 140 may also be programmed or configured to store data identifying a geographic location for each digital media file. For example, media repository 140 may store one or more tables which individually identify each digital media file and, for each digital media file, identify a location associated with the digital media file. The location may be identified as specific coordinates, such as latitudinal and longitudinal coordinates, and/or by geographic subdivisions, such as counties, cities, states, countries, or other geographic subdivisions.

In an embodiment, each of digital media files 142 contain media geographic data 146 and media 144. Media geographic data 146 may identify a location associated with the digital media file using specific coordinates and/or by geographic subdivisions. For example, media geographic data 146 may be contained within a header of each of digital media files 142. Media 144 may comprise the media portion of a digital media file. For example, a recorded video may be stored as header information followed by video information. The header information may include media geographic data 146 and the video information may include media 144.

Figure 2:
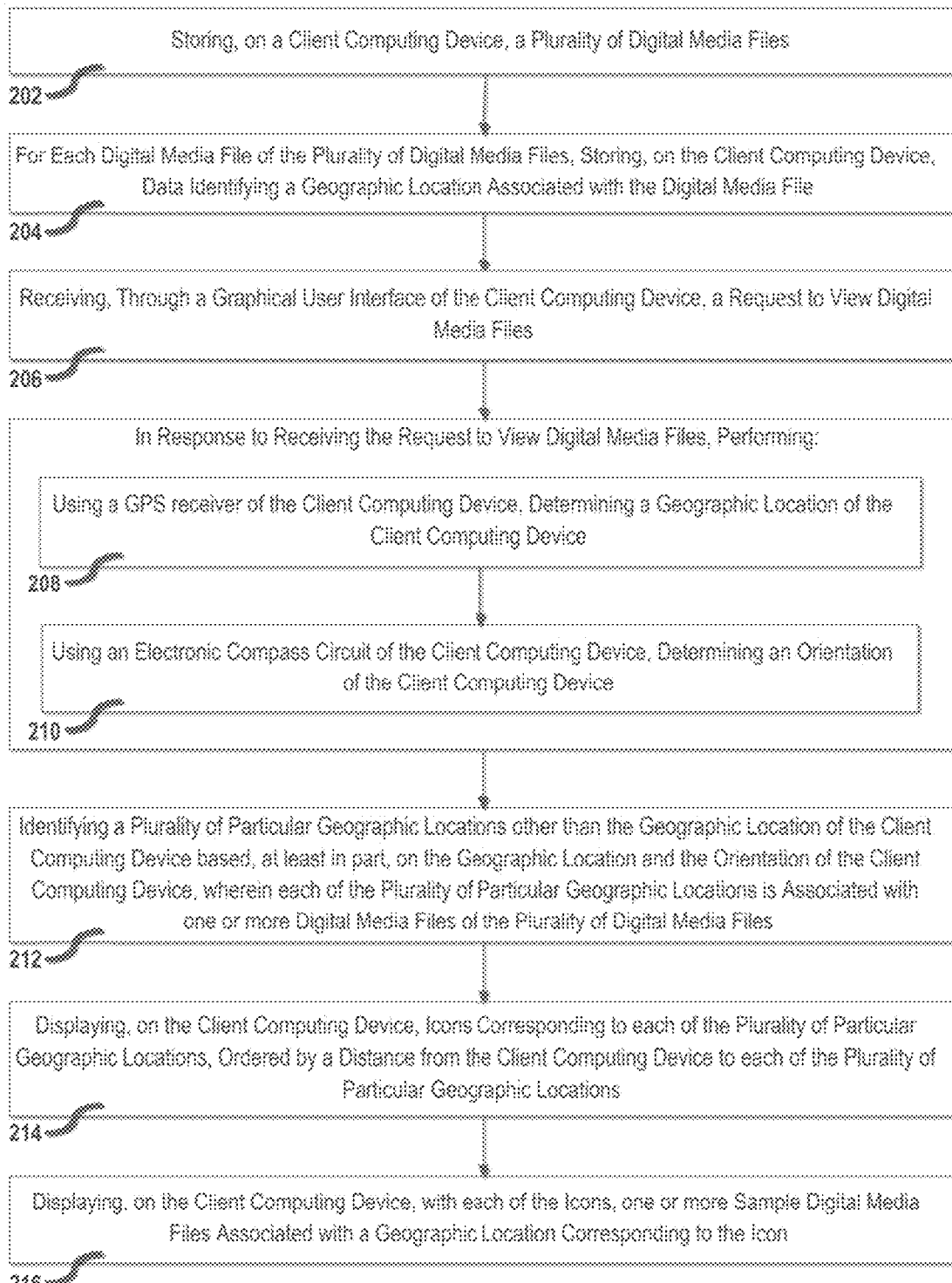
FIG. 2 depicts a method for displaying digital media on a client computing device based on location and orientation of the client computing device, according to an embodiment.

FIG. 2 depicts a method for displaying digital media on a client computing device based on location and orientation of the client computing device, according to an embodiment. The method described in FIG. 2 includes steps that may be performed in any order. For example, in an embodiment, step 210 may proceed step 208.

At step 202, a plurality of digital media files is stored on a client computing device. The plurality of digital media files may include any type of digital media including, but not limited to, digital photographs, digital audio files, digital media files, and data files such as data identifying prior telephone conversations.

At step 204, for each digital media file of the plurality of digital media files, data identifying a geographic location associated with the digital media file is stored on the client computing device. For example, each digital media file may contain metadata identifying a geographic location associated with the digital media file. Additionally or alternatively, the client computing device may store one or more tables which identify geographic locations for each piece of digital media.

The geographic locations associated with the digital media files may be identified at a time when the digital media file is first generated and/or obtained. For example, the GPS receiver of the client computing device may be used to identify a location of the client computing device when a photograph is taken using a camera of the client computing device. In this manner, the client computing device geotags the photographs with the location where the photograph is generated. A similar method may be used to geotag audio files and video files based on a location where the audio and/or video files are generated.

In an embodiment, the geographic location information is identified when the digital media file is received. For example, a GPS receiver of the client computing device may identify a location of the client computing device when a digital media file is received from an outside source. Additionally or alternatively, the digital media file may contain metadata that identifies a location where the received digital media file was generated. For example, a first person may take a photograph with a smart phone of the Eiffel Tower while on vacation in Paris and send the photograph to a second person in California. The first person's smart phone may geotag the photograph with the location where the photograph was generated. Thus, when the second person receives the photograph of the Eiffel Tower, the photograph may include a geotag that identifies the location of the first person's smart phone when the photograph was taken.

In an embodiment, the geographic location information may be generated based on locations of one or more other devices. For example, a digital media file may include a data record that identifies a previous phone call. At the time of the phone call, the location of the client computing device and an external telephone device may be identified. The geographic location information for the phone call may identify the location of the client computing device at the time of the phone call, the location of the external telephone device at the time of the phone call, and/or a combination of the two. The location of the external telephone device may be determined using a GPS receiver of the external telephone device. Additionally or alternatively, an area code of the external telephone device may be used to identify a generalized location of the external telephone device.

In an embodiment, the geographic location information may be added by a user of the client computing device. For example, a digital media file may include a data record that identifies contact information for a user of a different client computing device. When the user of the client computing device generates the contact information, an option may allow the user to enter a geographic location, such as a city and/or state, to be associated with the contact information. Additionally or alternatively, geographic location information may be determined for contacts dynamically. For example, one or more external devices may send location information to the client computing device. Thus, the location information for a contact may be based on a current location of an external device associated with the contact.

In an embodiment, geographic location information may include specific coordinates. For example, at the time a photograph is generated, the client computing device may identify geographic coordinates of the client computing device using the GPS receiver. Thus, each digital media file may be stored with data identifying the latitude and longitude of the client computing device at the time of creation of the digital media file. Additionally or alternatively, the geographic location information may include geographic subdivisions. For example, the client computing device may use the GPS receiver to identify the geographic coordinates of the client computing device. The client computing device may compare the geographic coordinates to a stored map which identifies geographic subdivisions based on geographic coordinates. Based on the map, the client computing device may identify a geographic subdivision associated with the client computing device at the time the digital media file is generated. The client computing device may then store data identifying the geographic subdivision with the digital media file and/or in a table or data record identifying the digital media file.

At step 206 a request to view digital media files is received through a graphical user interface of the client computing device. For example, the client computing device may execute a media application for displaying digital media. The media application may include a graphical user interface with an option to perform a location based search of the digital media files. Additionally or alternatively, the location based search may be performed automatically upon execution of the media application. Thus, the request to view digital media files may comprise execution of a media application for displaying media files.

In response to receiving the request to view digital media files, at step 208, a GPS receiver of the client computing device is used to determine a geographic location of the client computing device. For example, the client computing device may identify geographic coordinates associated with the client computing device at the time of the request using the GPS receiver of the client computing device. Additionally or alternatively, the client computing device may identify a geographic subdivision of the client computing device using GPS coordinates and a digital map. The media application may request the GPS coordinates of the client computing device from the GPS receiver and/or through an application programming interface (API) of an application that interacts with the GPS receiver.

Further in response to receiving the request to view digital media files, at step 210 an electronic compass circuit of the client computing device is used to determine an orientation of the client computing device. For example, a magnetometer may be used to identify an orientation of the client computing device based on the Earth's magnetic field. The media application may request the orientation of the client computing device from the electronic compass circuit and/or through an API of an application that interacts with the electronic compass circuit.

At step 212, a plurality of particular geographic locations other than the geographic location of the client computing device are identified based, at least in part, on the geographic location and the orientation of the client computing device, wherein each of the plurality of particular geographic locations is associated with one or more digital media files of the plurality of digital media files. For example, the client computing device may perform an orientation search for digital media files based on the geographic location information for each digital medial file. Specifically, the client computing device may search through geographic location information associated with the digital media files to identify digital media files associated with locations that are in a particular direction from the client computing device that is determined by the orientation of the client computing device.

In an embodiment, the particular geographic locations correspond to geographic subdivisions which are associated with one or more of the digital media files. For example, the client computing device may store a digital map which identifies geographic subdivisions. For each set of geographic coordinates, the client computing device may determine geographic subdivisions in which the geographic coordinates are situated. For example, the client computing device may identify one or more digital media files associated with geographic coordinates that are situated in a particular city. If the particular city is in a direction from the client computing device determined by the orientation of the client computing device, the particular city may be identified at step 212.

In an embodiment, identifying the plurality of particular geographic locations comprises identifying a zone originating from the client computing device and expanding from the client computing device in a direction of the orientation of the client computing device. A particular angle may be specified for generating the expanding zone. For example, from the client computing device, boundaries of the zone may be generated at five degrees clockwise and five degrees counterclockwise from the client computing device. Any geographic subdivision associated with a digital media file that falls within the expanding zone may be identified as one of the plurality of particular geographic locations.

In an embodiment, locations of geographic subdivisions are identified as a single set of coordinates. For example, the city of Sacramento may be identified as the coordinates of the center of the city. Thus, for the city of Sacramento to be selected, the coordinates of the center of the city would have to be in the expanding zone from the client computing device. Additionally or alternatively, geographic subdivisions may be identified based on the actual boundaries of the geographic subdivision. As long as a portion of the geographic subdivision is included in the expanding zone, the geographic subdivision may be selected.

In an embodiment, the size of geographic subdivisions changes dynamically based on one or more of a number of digital media files associated with the geographic subdivisions, a distance from the client computing device, and or a combination of the two. For example, a minimum of three digital media files may be specified for geographic subdivisions. Thus, if a client computing device stores two photographs associated with coordinates in Sacramento, Calif. and one photograph associated with coordinates in San Francisco, Calif., the photographs may be grouped into one geographic subdivision of Northern California. As another example, a maximum distance of four hundred miles may be specified for geographic subdivisions of a particular size, such as cities. After four hundred miles, the geographic subdivisions may switch to state or country size. Thus, if the client computing device is in Sacramento, Calif., then a geographic subdivision for Portland, Oreg. may be selected, but the geographic subdivision for Tokyo, Japan may be replaced with Japan.

At step 214, icons corresponding to each of the plurality of particular geographic locations are displayed on the client computing device ordered by a distance from the client computing device to each of the plurality of particular geographic locations. For example, the client computing device may display icons for each of the plurality of particular geographic locations on the client computing device. The icons may be ordered based on a distance from the client computing device. For example, icons relating to the closest identified geographic subdivisions may be displayed at the bottom of the screen while icons relating to the furthest identified geographic subdivisions may be displayed at the top of the screen, thereby simulating distance through perspective.

At step 216, one or more sample digital media files associated with a geographic location corresponding to each of the icons are displayed, on the client computing device, with the corresponding icons. For example, the geographic location icon for Sacramento, Calif. may be displayed next to a plurality of sample photographs that are associated with Sacramento, Calif. In an embodiment, a limited number of sample photographs may be displayed next to each of the corresponding icons. For example, a ten photograph maximum may be specified for each geographic location icon such that a maximum of ten sample photographs is displayed next to an icon for a particular geographic location icon regardless of a number of photographs associated with the geographic location.

In an embodiment, the sizes of the location icons and the sample digital media files may be determined based on a distance from the client computing device to the geographic locations corresponding to the location icons. For example, icons representing closer geographic locations may be larger than icons representing further geographic locations. Additionally, the sample media files for the closer location may be larger than the sample media files for the further location.

Figure 3:
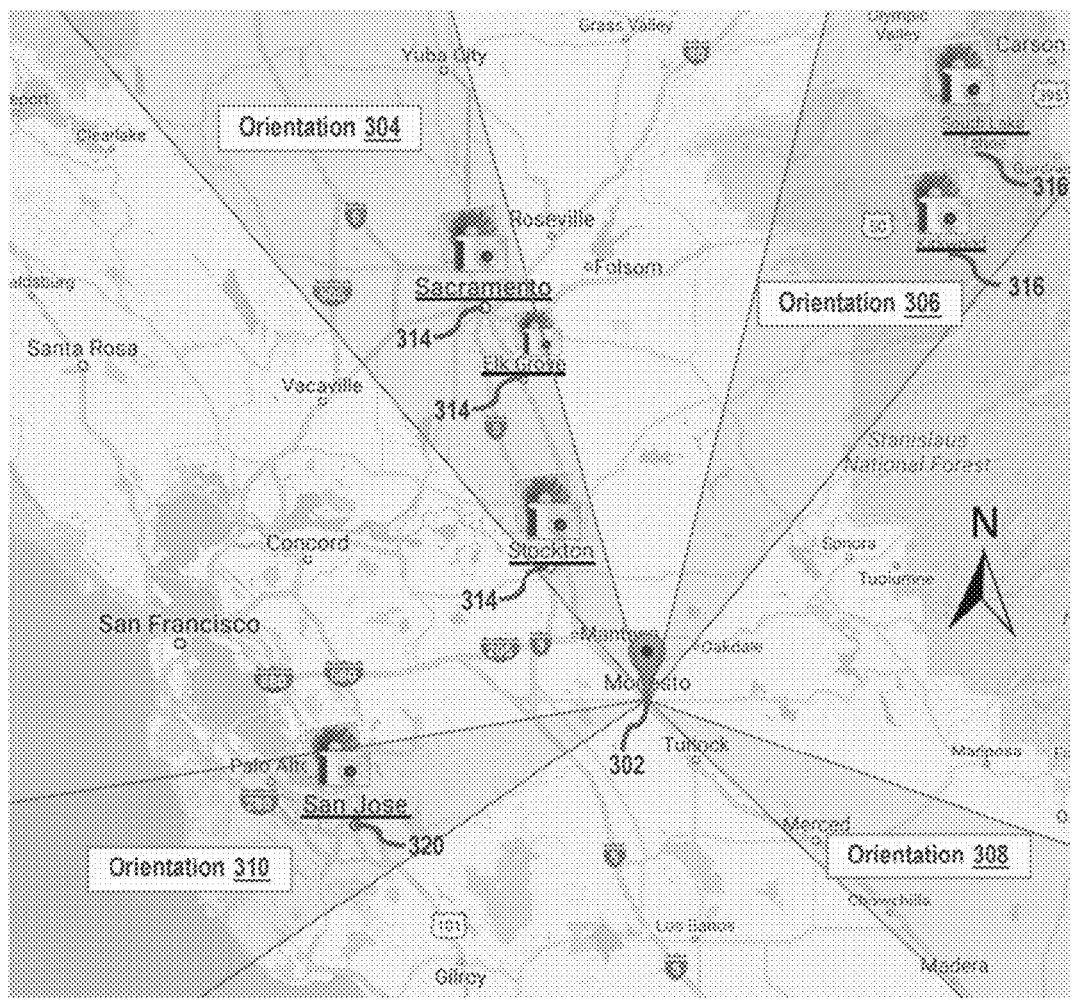
FIG. 3 depicts an example method for identifying geographic locations based on a location of a client computing device, an orientation of the client computing device, and location data for a plurality of digital media files.

FIG. 3 depicts an example method for identifying geographic locations based on a location of a client computing device, an orientation of the client computing device, and location data for a plurality of digital media files. While FIG. 3 shows a visual representation of an example method for identifying geographic locations, embodiments may be practiced without visual representations of the orientations and geographic locations. Specifically, a client computing device may identify the geographic locations by identifying a set of coordinates associated with digital media files that match one or more rules dictated by a location and orientation of a client computing device.

FIG. 3 illustrates client computing device location 302, orientation 304, orientation 306, orientation 308, and orientation 310. Orientations 302-310 inclusive comprise different executions of a location based search for digital media files. For example, a first search may occur when the client computing device is located at location 302 facing orientation 304, a second search may occur when client computing device is located at location 302 facing orientation 306, and so on.

When the client computing device faces orientation 304 from location 302, a zone is generated originating at location 302 and expanding in the direction of orientation 304. A predefined angle of expansion may control the speed at which the zone expands. For example, a smaller angle of expansion would cause the zone to expand slower as it moves away from location 302. The angle of expansion may be selected to optimize the number of locations identified in the search without requiring the client computing device to be extremely accurate in order to identify particular locations. For example, a large angle of expansion, such as a 30° angle would capture a large number of distant locations at most orientations without allowing the client computing device to differentiate between them with small changes in orientation. Conversely, a small angle of expansion, such as a 2° angle would capture less locations, but would require the client computing device to be fairly precise in orientation in order to capture distant locations. Thus, an angle between 2° and 30° may be predefined for performing location based searches.

When the client computing device faces orientation 304 from location 302, the generated zone includes geographic locations 314. In the embodiment of FIG. 3, geographic locations 314 are cities. In alternative embodiments, geographic locations 314 may be different geographic subdivisions such as counties, states, or separately defined subdivisions, such as portions of a state. Geographic locations 314 include the cities of Stockton, Elk Grove, and Sacramento as each of the cities corresponds to at least one digital media file. While Yuba City is included in the zone of orientation 304, Yuba City is not identified as one of geographic locations 314 because there are no digital media files associated with Yuba City.

In an embodiment, the client computing device dynamically updates search parameters as the client computing device is moved. For example, as the client computing device in FIG. 3 turns from orientation 304 to orientation 306, the display on the client computing device may continuously update. Thus, the display may first remove icons corresponding to Stockton while including icons corresponding to Sacramento and Elk Grove as the orientation of the client computing device shifts.

When the client computing device faces orientation 306, the icons for Sacramento and Elk Grove are no longer displayed. Instead, icons corresponding to geographic locations 316 will be displayed. Conversely, when the client computing device faces orientation 308, no icons will be displayed because there are no geographic locations in orientation 308 that are associated with digital media files. Finally, at orientation 310, geographic location 320 will be identified as the only geographic location associated with digital media files in orientation 310. Thus, a single icon for San Jose would be displayed on the client computing device.

Figure 4:
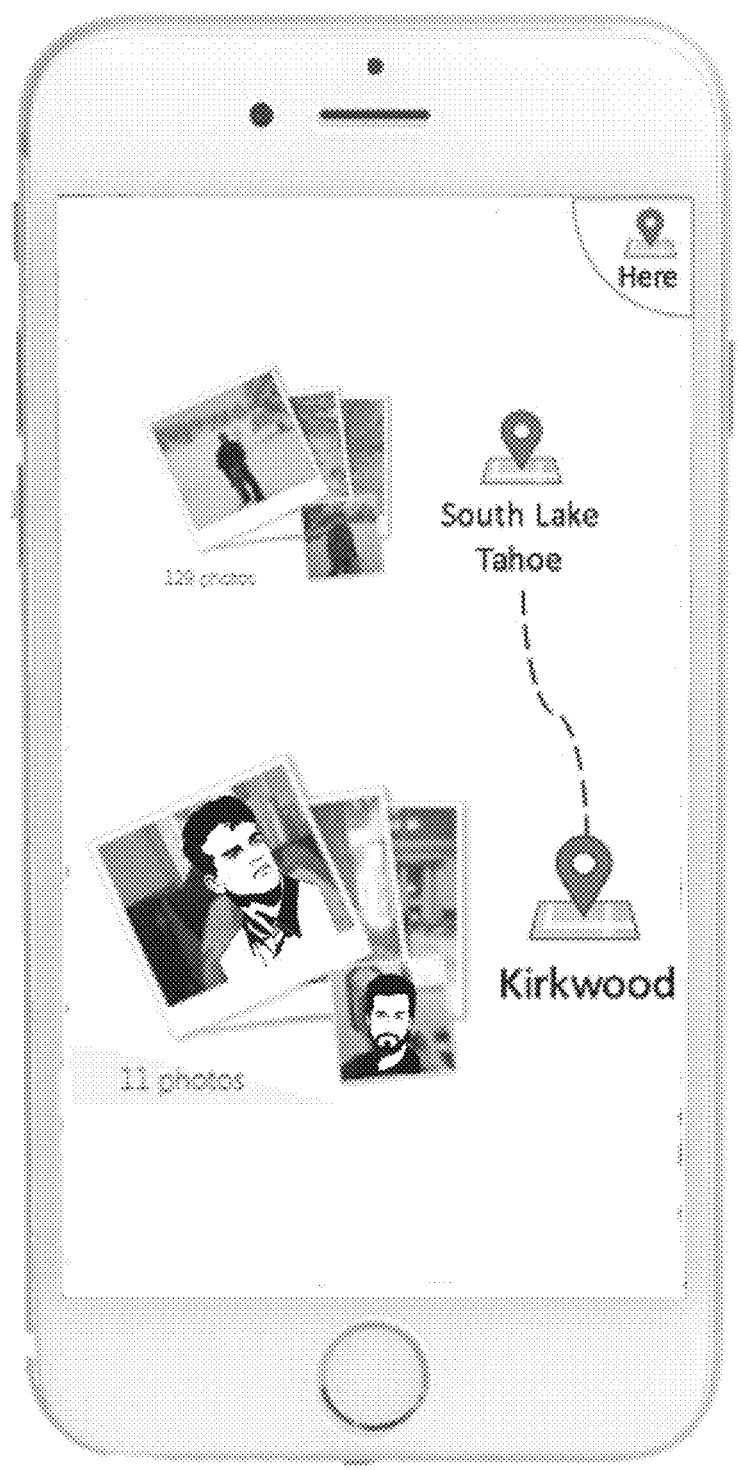
FIG. 4 depicts an example display of location icons for identified geographic locations and sample digital media files.

FIG. 4 depicts an example display of location icons for identified geographic locations and sample digital media files. FIG. 4 specifically depicts photographs for each location in orientation 306 of FIG. 3. In FIG. 4, the icon for Kirkwood is larger than the icon for South Lake Tahoe to indicate that Kirkwood is closer to the client computing device than South Lake Tahoe. In the example of FIG. 4, each icon is depicted next to four sample digital photographs. As with the icons, the sample photographs for Kirkwood are larger than the sample photographs for South Lake Tahoe in order to indicate that Kirkwood is closer than South Lake Tahoe.

In an embodiment, the client computing device receives a selection of one of the geographic icons and/or sample photographs. In response to receiving the selection, the client computing device may display an interface for viewing all of the digital media files corresponding to the selected geographic icon and/or sample photograph. For example, if a user selects South Lake Tahoe in FIG. 4, the client computing device may display an interface that allows the user to scroll through the 129 photos associated with South Lake Tahoe. If the user selects the geographic icon associated with Kirkwood, the client computing device may display an interface that allows the user to scroll through the 11 photos associated with Kirkwood.

In an embodiment, the display on the client computing device includes an option to view digital media files associated with a location of the client computing device. For example, in FIG. 4, the display of the client computing device includes an option for "Here" in the top right corner. Upon receiving a selection of the "Here" icon, the client computing device may display a user interface for viewing digital media files associated with the client computing device. Thus, if the client computing device determines that the client computing device is in Modesto, Calif., the location of Modesto, Calif. would not appear on any orientation of the client computing device. Instead, digital media files associated with Modesto may be viewed by selecting the "Here" option.

Figure 5:
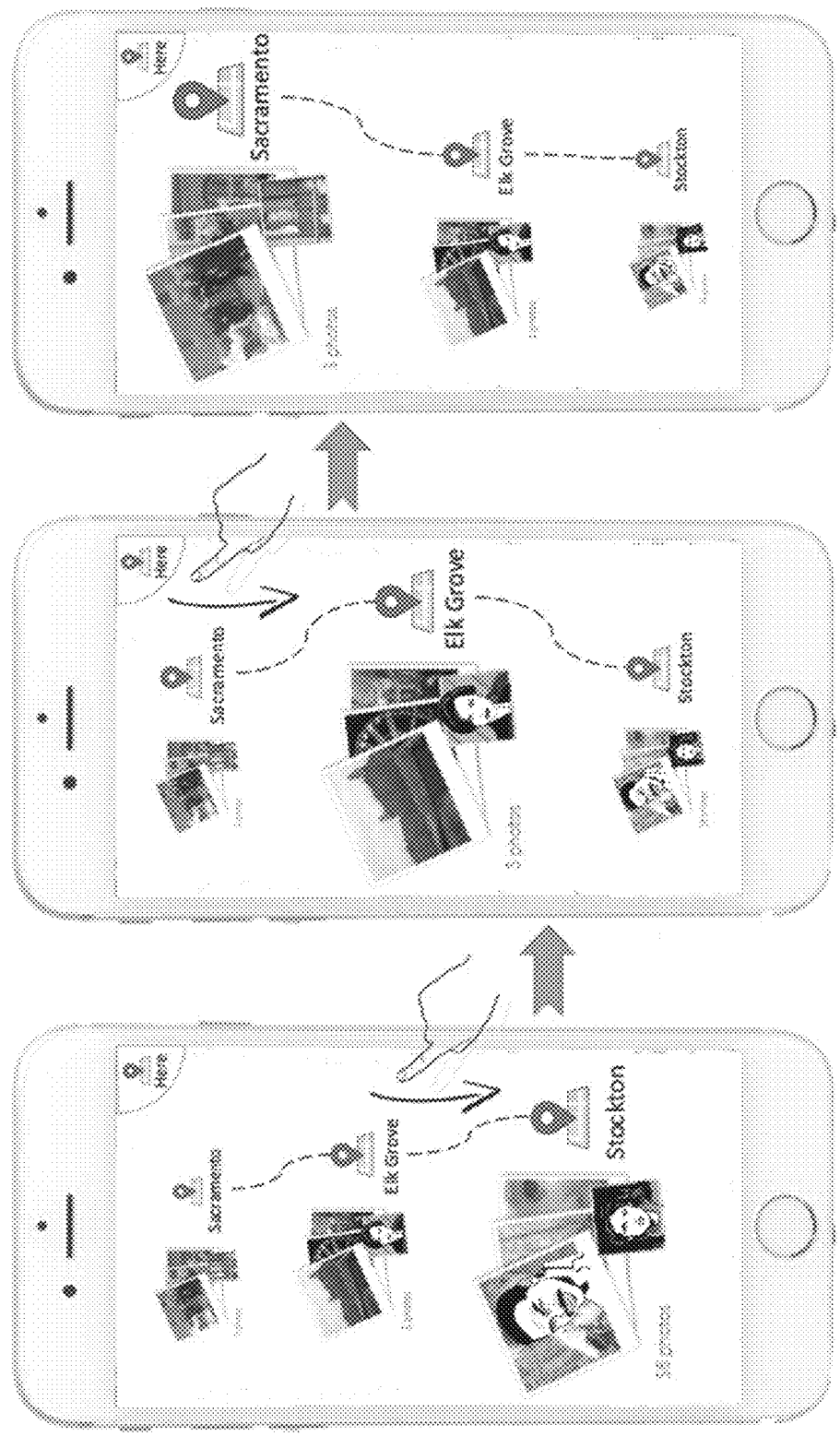
FIG. 5 depicts a method of interacting with a display of a client computing device in order to view digital media files taken at different locations.

FIG. 5 depicts a method of interacting with a display of a client computing device in order to view digital media files taken at different locations. FIG. 5 depicts a smart phone displaying location icons and sample photographs associated with orientation 304 or FIG. 3. In the first instance of the client computing device, the icons are sized based on distance from the client computing device. Thus, the Stockton icon is larger than the Elk Grove icon which is larger than the Sacramento icon.

In an embodiment, the display interface allows a user to change a focus onto different locations by interacting with the display interface. For example, in FIG. 5, a user interacts with the client computing device by swiping a finger downwards on a touchscreen. In response to the input of the downward swipe, the client computing device changes the focus from Stockton, the closest of the geographic locations, to Elk Grove, the next closest of the geographic icons. Thus, in the second instance of the client computing device, the icon and sample photographs corresponding to Elk Gove are larger than all other icons and sample photographs. In response to a subsequent downward swipe, the client computing device changes the focus from Elk Grove to Sacramento, thereby making the Sacramento icon and corresponding photographs larger than the Elk Grove and Stockton icons and photographs.

3. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
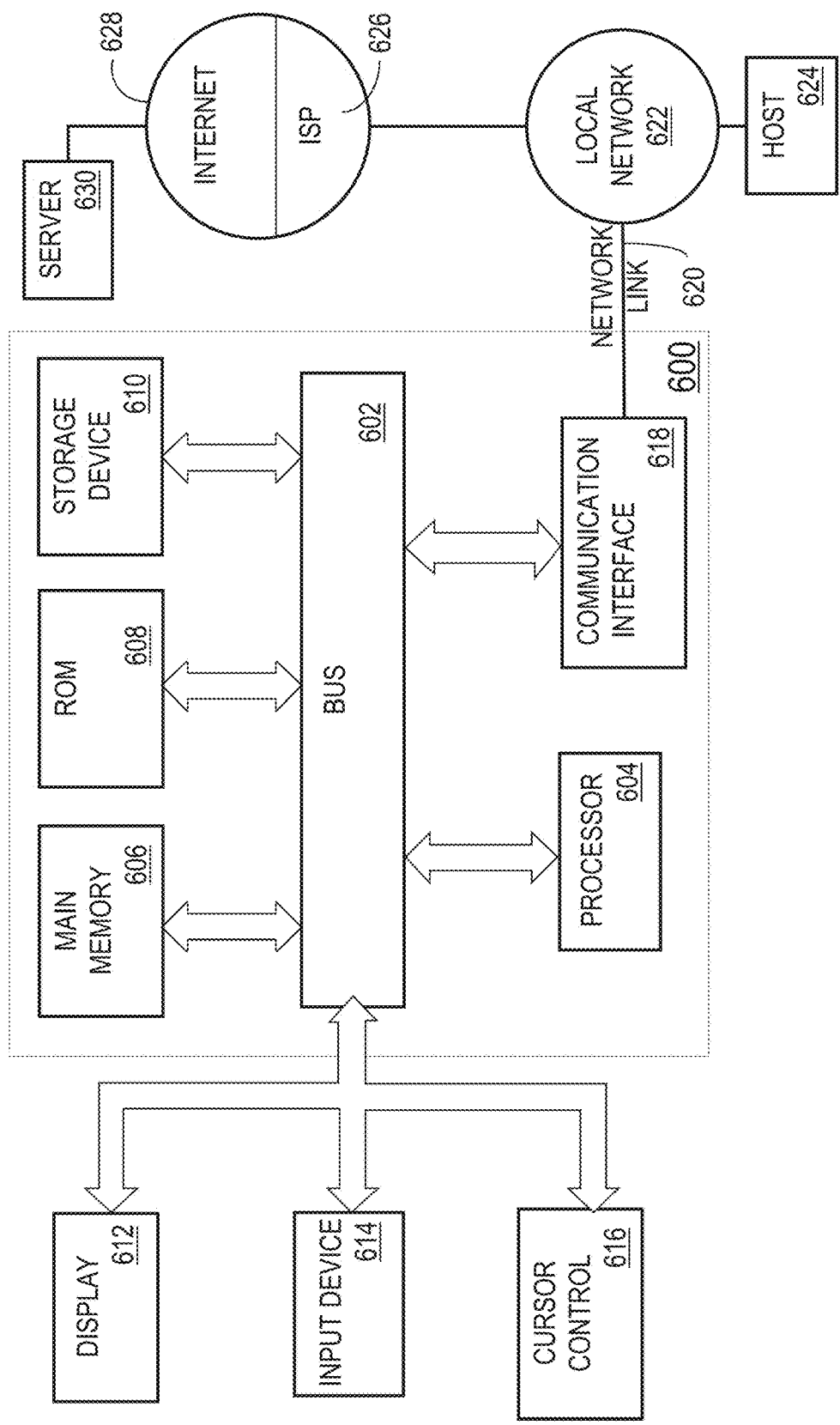
FIG. 6 is a block diagram that illustrates a computer system upon which an embodiment may be implemented.

For example, FIG. 6 is a block diagram that illustrates a computer system 600 upon which an embodiment may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   storing, on a client computing device, a plurality of digital media files;
   for each digital media file of the plurality of digital media files, storing, on the client computing device, data identifying a geographic location associated with the digital media file;
   receiving, through a graphical user interface of the client computing device, a request to view digital media files;
   in response to receiving the request to view digital media files, using a GPS receiver of the client computing device, determining a geographic location of the client computing device, and using an electronic compass circuit of the client computing device, determining an orientation of the client computing device;
   generating a zone originating at the geographic location of the client computing device expanding in a direction of the orientation of the client computing device at a predefined angle of expansion;
   identifying a plurality of particular geographic locations other than the geographic location of the client computing device that are both within the zone and associated with one or more digital media files of the plurality of digital media files stored on the client computing device;
   displaying, on the client computing device, icons corresponding to each of the plurality of particular geographic locations, ordered by a distance from the client computing device to each of the plurality of particular geographic locations;
   displaying, on the client computing device, with each of the icons, one or more sample digital media files associated with a geographic location corresponding to the icon.

2. The method of claim 1, further comprising:
   receiving and storing, at the client computing device, a particular digital media file of the plurality of digital media files;
   in response to receiving and storing the particular digital media file, using the GPS receiver of the client computing device, determining a set of geographic coordinates that correspond to a current position of the client computing device;

identifying a city that corresponds to the set of geographic coordinates;

storing, with the particular digital media file, data identifying the city as the geographic location associated with the particular digital media file.

3. The method of claim 1, wherein identifying the plurality of particular geographic locations other than the geographic location of the client computing device comprises:

determining that at least a portion of each particular geographic location of the plurality of particular geographic locations is within the zone.

4. The method of claim 3, wherein identifying the plurality of particular geographic locations further comprises:

storing a distance threshold and geographic subdivision area threshold;

for a portion of the zone within the distance threshold of the client computing device, identifying only geographic subdivisions that contain an area less than the geographic subdivision area threshold;

for a portion of the zone past the distance threshold of the client computing device, identifying geographic subdivisions that contain an area greater than the geographic subdivision area threshold.

5. The method of claim 1, wherein identifying the plurality of particular geographic locations other than the geographic location of the client computing device comprises:

determining, for each particular geographic location of the plurality of particular geographic locations, that a particular set of geographic coordinates associated with the particular geographic location is within the zone.

6. The method of claim 1, further comprising:

receiving a selection of a particular icon corresponding to a particular geographic location of the plurality of particular geographic locations;

displaying, on the client computing device, one or more digital media files associated with the particular geographic location.

7. The method of claim 1, further comprising:

displaying a particular icon corresponding to geographic location of the client computing device;

receiving a selection of the particular icon;

displaying, on the client computing device, one or more digital media files associated with the geographic location of the client computing device.

8. The method of claim 1, wherein displaying, on the client computing device, icons corresponding to each of the plurality of particular geographic locations comprises:

displaying a first icon corresponding to a first geographic location in a first size;

determining that a second geographic location is further from the client computing device than the first geographic location and, in response, displaying a second icon corresponding to the second geographic location in a second size that is smaller than the first size.

9. The method of claim 8, further comprising receiving, through the graphical user interface, input requesting a focus on the second icon and, in response, increasing the second size of the second icon and decreasing the first size of the first icon.

10. One or more non-transitory storage media storing instructions which, when executed by one or more computing devices, cause performance of:

storing, on a client computing device, a plurality of digital media files;

for each digital media file of the plurality of digital media files, storing, on the client computing device, data identifying a geographic location associated with the digital media file;

receiving, through a graphical user interface of the client computing device, a request to view digital media files;

in response to receiving the request to view digital media files, using a GPS receiver of the client computing device, determining a geographic location of the client computing device, and using a electronic compass circuit of the client computing device, determining an orientation of the client computing device;

generating a zone originating at the geographic location of the client computing device expanding in a direction of the orientation of the client computing device at a predefined angle of expansion;

identifying a plurality of particular geographic locations other than the geographic location of the client computing device that are both within the zone and associated with one or more digital media files of the plurality of digital media files stored on the client computing device;

displaying, on the client computing device, icons corresponding to each of the plurality of particular geographic locations, ordered by a distance from the client computing device to each of the plurality of particular geographic locations;

displaying, on the client computing device, with each of the icons, one or more sample digital media files associated with a geographic location corresponding to the icon.

11. The one or more non-transitory storage media of claim 10 wherein the instructions, when executed by the one or more computing devices, further cause performance of:

receiving and storing, at the client computing device, a particular digital media file of the plurality of digital media files;

in response to receiving and storing the particular digital media file, using the GPS receiver of the client computing device, determining a set of geographic coordinates that correspond to a current position of the client computing device;

identifying a city that corresponds to the set of geographic coordinates;

storing, with the particular digital media file, data identifying the city as the geographic location associated with the particular digital media file.

12. The one or more non-transitory storage media of claim 10, wherein identifying the plurality of particular geographic locations other than the geographic location of the client computing device comprises:

determining that at least a portion of each particular geographic location of the plurality of particular geographic locations is within the zone.

13. The one or more non-transitory storage media of claim 12, wherein identifying the plurality of particular geographic locations further comprises:

storing a distance threshold and geographic subdivision area threshold;

for a portion of the zone within the distance threshold of the client computing device, identifying only geographic subdivisions that contain an area less than the geographic subdivision area threshold;

for a portion of the zone past the distance threshold of the client computing device, identifying geographic subdivisions that contain an area greater than the geographic subdivision area threshold.

14. The one or more non-transitory storage media of claim 10, wherein identifying the plurality of particular geographic locations other than the geographic location of the client computing device comprises:
   determining, for each particular geographic location of the plurality of particular geographic locations, that a particular set of geographic coordinates associated with the particular geographic location is within the zone.

15. The one or more non-transitory storage media of claim 10 wherein the instructions, when executed by the one or more computing devices, further cause performance of:
   receiving a selection of a particular icon corresponding to a particular geographic location of the plurality of particular geographic locations;
   displaying, on the client computing device, one or more digital media files associated with the particular geographic location.

16. The one or more non-transitory storage media of claim 10 wherein the instructions, when executed by the one or more computing devices, further cause performance of:
   displaying a particular icon corresponding to geographic location of the client computing device;
   receiving a selection of the particular icon;
   displaying, on the client computing device, one or more digital media files associated with the geographic location of the client computing device.

17. The one or more non-transitory storage media of claim 10, wherein displaying, on the client computing device, icons corresponding to each of the plurality of particular geographic locations comprises:
   displaying a first icon corresponding to a first geographic location in a first size;
   determining that a second geographic location is further from the client computing device than the first geographic location and, in response, displaying a second icon corresponding to the second geographic location in a second size that is smaller than the first size.

18. The one or more non-transitory storage media of claim 17 wherein the instructions, when executed by the one or more computing devices, further cause performance of receiving, through the graphical user interface, input requesting a focus on the second icon and, in response, increasing the second size of the second icon and decreasing the first size of the first icon.

* * * * *